United States Patent Office 3,342,671
Patented Sept. 19, 1967

3,342,671
1,4 - DIHALO - 1,4 - DINITRO - 1,3 - BUTADIENE
FOLIAGE FUNGICIDES AND BACTERICIDES
Anthony A. Sousa and Harvey W. Spurr, Jr., Raleigh,
N.C., assignors to Union Carbide Corporation, a corporation of New York
No Drawing. Filed Mar. 8, 1965, Ser. No. 438,063
17 Claims. (Cl. 167—22)

This invention relates to 1,4-dihalo-1,4-dinitro-1,3-butadienes. It is particularly directed to methods for their use as foliage fungicides and to compositions containing them. In a particular aspect, this invention is concerned with 1,4-di(middle)-halo-1,4-dinitro-1,3-butadienes useful for controlling foliage fungi.

The need for efficient and economical fungicidal and fungistatic compositions has long been manifest. In spite of this fact, however, a vast number of the compounds employed as fungicides, have been found lacking in one or more of the basic requirements of a satisfactory fungicide. In order to be commercially useful a fungicidal composition must be compatible with adjuvants and other active ingredients; it must be economical; it should be soluble in common solvents and stable; and most importantly, it must not be toxic to the host plants to which it is applied or to animal life. A prohibitive degree of phytotoxicity under the conditions utilized for fungus control and toxicity toward warm-blooded animals are among the most common shortcomings of present fungicides.

It is, consequently, the principal object of the present invention to provide a new and novel method for controlling foliage fungi with 1,4-dihalo-1,4-dinitro-1,3-butadienes which can be economically prepared, distributed and applied to plants.

Yet another object of the present invention is to provide a method for combatting foliage fungi by applying these compositions to plants.

Still another object is to provide a method for controlling apple scab, early blight and cucumber anthracnose employing 1,4-dibromo- and 1,4-dichloro-1,4-dinitro-1,3-butadienes.

Other objects, features and advantages will be apparent from the following description read in conjunction with the appended claims.

Although the literature is replete with references to the biological activity of nitroolefins and their derivatives, and although there are many papers dealing with the chemistry of this group of compounds, no references have been found dealing with the biological activity of either 1,4-dibromo-1,4-dinitro-1,3-butadiene or 1,4-dichloro-1,4-dinitro-1,3-butadiene.

It now has been found that 1,4-dibromo-1,4-dinitro-1,3-butadiene and 1,4-dichloro-1,4-dinitro-1,3-butadiene possess unexpected utility in the control of fungal diseases of plants. In particular, it has been found that the aforementioned butadienes possess unexpected utility as foliage fungicides. This utility was unexpected in view of no known disclosure in the art of the use of aliphatic dinitro-dihalo-dienes as plant fungicides.

The 1,4-dihalo-1,4-dinitro-1,3-butadiene fungicides of this invention can be represented by Formula I:

(I) 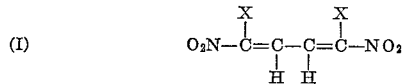

wherein X is halogen, preferably a middle-halogen, i.e., chlorine or bromine. The preferred compounds are the 1,4-di(middle)halo-1,4-dinitro-1,3-butadienes, i.e., 1,4-dibromo-1,4-dinitro-1,3-butadiene and 1,4-dichloro-1,4-dinitro-1,3-butadiene.

The preferred compounds of this invention can be specifically represented by Formulae II and III:

(II) 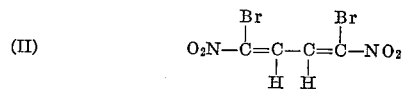

(III) 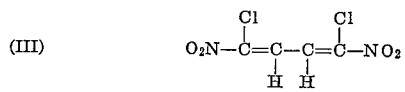

wherein II is 1,4-dibromo-1,4-dinitro-1,3-butadiene and III is 1,4-dichloro-1,4-dinitro-1,3-butadiene.

In general, the 1,4-dihalo-1,4-dinitro-1,3-butadienes encompassed herein can be conveniently prepared up through the 1,4-dinitro-1,3-butadiene according to the procedure disclosed in Novikoff et al. Bull. Acad. Sci. U.S.S.R., Chem. Div. (English translation) 882 (1960). The 1,4-dinitro-1,3-butadiene is then halogenated to the 1,4-dinitro-1,2,3,4-tetrahalobutane followed by dehydrohalogenation to give the 1,4-dinitro-1,4-dihalo-1,3-butadienes.

Briefly, the preparation of the 1,4-dihalo-1,4-dinitro-1,3-butadienes involves the base-catalyzed addition of nitromethane to glyoxal to give 1,4-dinitrobutane-2,3-diol; the preparation of the diacetyl derivative of this diol with acetyl chloride in acetic acid to give 1,4-dinitro-2,3-diacetoxybutane; the deacetoxylation of this diester to give 1,4-dinitro-1,3-butadiene; the halogenation of this diene to give the 1,4-dinitro-1,2,3,4-tetrahalobutane; and the dehydrohalogenation of the tetrahalobutane to give the 1,4-dihalo-1,4-dinitro-1,3-butadienes of this invention.

The 1,4-dihalo-1,4-dinitro-1,3-butadienes per se can be more fully illustrated by the following specific examples:

EXAMPLE I

*1,4-dibromo-1,4-dinitro-1,3-butadiene*

Two equivalents of bromine in dioxane solution were added to 1 equivalent of 1,4-dinitro-1,3-butadiene in dioxane solution to yield a crude oil mixture. To 2.43 grams (0.00522 mole) of this mixture in benzene was added 30 grams of a magnesia-silica gel (MgO, 15.51; $SiO_2$, 84.01; $Na_2SO_4$, 0.51) and the resulting mixture was stirred for 20 hours. The gel was then removed by filtration and the benzene evaporated to give 1.49 grams, corresponding to a yield of 94 percent of theory, of a yellow solid which, upon recrystallization from petroleum ether, had a melting point of 125–126° C. and the following analysis:

Calculated for $C_4H_2N_2O_4Br_2$: C, 15.9%; H, 0.66%, N, 9.27%; Br, 52.98%. Found: C, 16.17%, H, 0.62%; N, 9.07%; Br, 52.77%.

Structure was confirmed by infrared analysis.

EXAMPLE II

*1,4-dichloro-1,4-dinitro-1,3-butadiene*

A mixture of 1,4-dinitro-1,2,3,4-tetrachlorobutane (19.4 g., 0.0680 mole), prepared in a manner similar to that in Example I for the preparation of 1,4-dinitro-1,2,3,4-tetrabromobutane, 1500 ml. of benzene and 500 g. of Florisil were allowed to stir together at room temperature for 4 hours. The mixture was placed on a chromatography column and eluted with benzene until a thin layer chromatograph (benzene) indicated that all of the product has been eluted (3 l. of benzene). Concentration of the benzene afforded 15 g. of a yellow solid. The product was recrystallized from carbon tetrachloride to yield 14.20 g. of 1,4-dichloro-1,4-dinitro-1,3-butadiene, M.P. 124–125° C. The infrared spectrum (potassium bromide) showed absorption at 3110, 3080 (=C—H); 2930, 2850, (not assigned); 1568 (C=C); 1532 and 1322 cm.$^{-1}$ ($NO_2$).

The UV showed max. $CH_3OH=330$ mu. $\epsilon=12,928$. The NMR ($CDCl_3$) showed only one resonance, a singlet at $\delta=8.03$ p.p.m.

*Analysis.*—Calc'd. for $C_4H_2N_2ClO_4$: C, 22.54; H, 0.95; N, 13.16; Cl, 33.29. Found: C, 22.75; H, 0.87; N, 12.88; Cl, 33.25.

The 1,4-dihalo-1,4-dinitro-1,3-butadienes of this invention show particular promise as foliage fungicides. The two dihalo-dinitro-butadienes, 1,4-dibromo-1,4-dinitro-1,3-butadiene and 1,4-dichloro-1,4-dinitro-1,3-butadiene, are particularly effective foliage fungicides for control of tomato early blight, cucumber anthracnose and apple scab. These compounds have effectively protected plants from early blight and anthracnose infections and eradicated apple scab. The relative effectiveness of these compounds is demonstrated in Table I.

Compounds which receive a "4" or "5" rating are retested in serial dilution to quantitate the activity. The degree of infection is determined by an actual count of the number of lesions on 8 leaflets on the 3 top leaves of each plant. The percent disease is based on a comparison of the number of lesions on the treated versus the untreated plants. The percent disease is transposed to a numerical rating as follows:

5=0–10% disease.
4=11–30% disease.
3=31–50% disease.
2=51–75% disease.
1=76–100% disease.

CUCUMBER ANTHRACNOSE TEST

*Colletotrichum lagenarium.*—The pathogen is cultured

TABLE I

| Compound | Control Rating [1] | | | | | | | | |
|---|---|---|---|---|---|---|---|---|---|
| | Early Blight, p.p.m. | | | Cucumber Anthracnose, p.p.m | | | Apple Scab, p.p.m. | | |
| | 100 | 20 | 4 | 100 | 20 | 4 | 1,500 | 300 | 60 |
| 1,4-dichloro-1,4-dinitro-1,3-butadiene | 5 | 1 | 1 | 5 | 1 | 1 | 5 | 5 | |
| 1,4-dibromo-1,4-dinitro-1,3-butadiene | 4 | 1 | 1 | 5 | 2 | 2 | 5 | 5 | 3 |

REFERENCE STANDARDS

| | | | | | | | | | |
|---|---|---|---|---|---|---|---|---|---|
| Zinc ethylene bis dithiocarbamate | 5 | 5 | 1 | | | | | | |
| N-trichloromethylmercapto-4-cyclohexene-1,2-dicarboximide | | | | | | | 2 | 1 | 1 |
| n-Dodecylguanidine acetate | | | | | | | 5 | 5 | 4 |
| Manganous ethylene bis dithiocarbamate | | | | 5 | 5 | 5 | | | |

[1] Control ratings from complete control (5) to no control (1) as defined in the following test procedures.

EARLY BLIGHT TOMATO FOLIAGE DISEASE PROTECTANT TEST

Tomato early blight fungus (*Alternaria solani*). The organism is cultured on potato dextrose agar at a temperature of 20° C. Transfers are made to petri dishes 8 days prior to testing and scraped and irradiated with ultraviolet for one minute one day prior to testing.

One tomato plant variety Bonny Best of a standard age and height is sprayed on a revolving turntable. A 100–110 ml. volume of the formulated water mixture of chemical is applied to each plant with a DeVilbiss spray gun, air pressure set at 40 pounds. Application of this volume of spray takes 25 seconds. Similar applications to other plants are made with a water solution containing acetone and emulsifier in the same concentration as the test mixture but without the candidate pesticide. These plants are untreated checks or controls for the experiment. As soon as the spray has dried, the plants are inoculated by again placing them on the turntable and spraying with a spore suspension of early blight (containing 12,000–15,000 spores per ml. of water) for 30 seconds at 20 pounds pressure.

The test compounds are formulated by a standard procedure of solution in acetone, addition of an emulsifier, and dilution with water. Primary applications are conducted at 100 p.p.m.

Following inoculation the plants are incubated for 24 hours at 70° F. and 100 percent relative humidity. The plants are then removed from the incubation chamber and held for an additional 24 hours at room temperature.

The degree of infection is visually rated according to the following designations:

5=no lesions (perfect control).
4=very few lesions.
3=moderately infected.
1=many lesions, equal to untreated control plants.

on freshly prepared lima bean agar. One week following inoculation pink spore masses are formed. An aqueous suspension containing 200,000–500,000 spores per ml. is prepared as inoculum.

Cucumber plants 2–4 weeks of age (Variety, National Pickling) are the host plants. The plants are grown in 3 inch pots. Two plants per pot are sprayed on a revolving turntable. A 100–110 ml. volume of the formulated water mixture of the chemical is applied to the plants with a DeVilbiss spray gun with air pressure set at 40 pounds p.s.i. Application of this volume of spray takes 25 seconds. An equal volume of a water solution containing acetone and emulsifier in the same concentrations as the fungicidal mixture but without the candidate fungicide is also sprayed on 4 cucumber plants which are held as untreated checks or controls. As soon as the spray has dried, the plants are inoculated by again placing them on the turntable and spraying with the spore suspension of anthracnose for 30 seconds at 20 pounds pressure.

The test compounds are formulated by a standard procedure of solution in acetone, addition of an emulsifier, and dilution with water. Initial tests are conducted at 100 p.p.m.

Following inoculation the plants are incubated for 24 hours at 70° F. and 100 percent relative humidity. The plants are then removed from the incubation chamber and held at 80° F. and 50 percent relative humidity until symptoms of disease develop.

One week after inoculation counts are made of the total number of lesions found on the primary leaves of each plant, treated and untreated. The percent control is calculated, and results are reported according to the following designations:

5=90–100% control.
4=70–89% control.
3=50–69% control.
2=25–49% control.
1=0–24% control.

Compounds which receive a rating of "5" or "4" pass to secondary testing. In secondary testing the concentration of the toxicant is lowered in dilution series in order to determine the minimum effective dose.

APPLE SCAB ERADICATION TEST

*Venturia inaequalis* (cke.) Wint., University of Wisconsin Strain 365–4. The organism is cultured on freshly prepared potato dextrose at a temperature of 16° C. Conidia should be between 10 and 20 days old. The conidia are washed with distilled water by the centrifugation technique. A suspension containing approximately 100,000 organisms per ml. is employed as inoculum, Twenty-four hours prior to testing apple seedlings are inoculated by placing them on a turntable and spraying them with the spore suspension for 30 seconds at 20 pounds p.s.i. The plants are then incubated at 58°–72° C. in a moist chamber (relative humidity 100 percent) for 24 hours. The moist chamber must provide a normal diurnal life cycle. A transparent chamber in the greenhouse is satisfactory.

Apple seed obtained from McIntosh apples are stored in damp peat moss for a period of 4–6 weeks at 5° C. to break dormancy. The seed are then sown in 3½ inch pots. The seedlings are held in the greenhouse until 4–5 young succulent leaves are formed.

The apple seedlings infected with scab, 2 pots per test concentration, are sprayed on a revolving turntable. Approximately 100–110 ml. of the formulated aqueous mixture of the chemical is applied to the plant with a De Vilbiss spray gun with air pressure set at 40 pounds pressure. Application of this volume of spray takes 25 seconds. An equal volume of water solution containing acetone and emulsifier in the same concentrations as the fungicidal mixture but without the candidate apple scab eradicant is also applied to 4 apple seedlings which are employed as untreated control or check plants.

The test compounds are formulated by a standard procedure of solutions in acetone, addition of an emulsifier, and dilution with water. Initial tests are conducted at 1,500 p.p.m. In secondary tests the concentration of the compound is lowered in serial dilution in order to determine the minimum effective dose.

The sprayed plants are returned to the moist chamber for an additional 72–96 hours and are then transferred to the greenhouse bench. Greenhouse temperatures must be below 75° F. to insure successful disease development.

Results are taken 1–2 weeks after inoculation (upon appearance of lesions on untreated control plants). The degree of infection is visually rated according to the following designations:

5=no lesions (perfect eradication).
4=very few lesions.
3=moderately infected.
1=many lesions, equal to untreated control plants.

The dihalo-dinitro-butadiene, 1,4-dibromo-1,4-dinitro-1,3-butadiene has shown outstanding performance against apple scab, *Venturia inaequalis*, on McIntosh apple trees. The dibromo compound has been found to be somewhat more effective against apple scab than the dichloro analog and somewhat less phytotoxic. Both 1,4-dibromo-1,4-dinitro-1,3-butadiene and 1,4-dichloro-1,4-dinitro-1,3-butadiene gave an $ED_3$ of 100 parts per million against the early blight organism *Alternaria solani*. The $ED_3$ is a given concentration of compound in parts per million which elicit a rating of "3" on the scale as defined hereinabove with reference to the test procedures. As employed herein the terms $ED_3$ and $LD_{50}$ are, from a practical standpoint, synonymous.

The following compounds were all compared along with 1,4-dibromo- and 1,4-dichloro-1,4-dinitro-1,3-butadiene as foliage fungicides against the early blight causing organism *Alternaria solani* and were all found to be essentially inactive in that they all received a "1" rating as hereinabove defined, indicating the presence of 76 to 100 percent disease:

$\beta$-bromo-$\beta$-nitrostyrene;
$\beta$-chloro-$\beta$-nitrostyrene;
$\beta$-chloro-$\alpha$-nitrostyrene;
$\beta$-nitrostyrene;
$\alpha,\beta$-dibromo-$\beta$-nitroethylbenzene;
$\alpha,\beta$-dichloro-$\beta$-nitroethylbenzene;
1,4-dichloro-2-nitro-1,3-butadiene;
2-methyl-1-nitro-1-butene;
2-nitro-2-hexene;
1-nitro-1-nonene;
1-nitro-3,3,3-trichloropropene;
1,4-dinitro-1,3-butadiene;
2,3-diacetoxy-1,4-dinitrobutane;
1,4-dinitro-2,3-butanediol;
1-chloro-1-nitro-1-heptene;
1-chloro-1-nitro-1-hexene;
1-chloro-1-nitro-1-pentene; and
1,4-dinitro-1,2,3,4-tetrabromobutane.

The active compounds of the present invention may be used alone or in combination with other fungicidal, viricidal, insecticidal, or acaricidal materials, the action of which may be either internal or external, with plant nutritives, plant hormones and the like. Wetting agents, and if necessary or desirable, stickers such as the heavy hydrocarbon oils can be present. Any conventional wetting agent which will not react with the toxicant, for example, alkyl sulfate salts, alkyl aryl sulfonate salts, sulfosuccinate salts, ethers from polyethylene glycols and alkylated phenols, and the like can be employed. If the toxic agents are employed in the form of emulsions or suspensions for example, in water, solvents such as oils, emulsifiers, emulsion stabilizers, and the like may be added if desired. For example, glucose is known to protect tomato plants against damage by certain substances having a phytotoxic effect when employed in concentrated form.

The compounds of the present invention may be applied by means of spraying. Spraying of the plants to be treated may be performed with aqueous emulsions, solutions or suspensions of the active agents. The spray liquid is generally applied at a rate of from about 5 to 100 gallons per acre. If spraying is effected with smaller quantities of liquid as in low volume spraying, high concentrations of the active agents should be employed. If desired, a minor amount of the order of about 0.01 to about 0.05% by weight, of a wetting agent may be added to aid in forming a suspension of the active compound in the aqueous medium. Any of the conventional wetting agents can be employed. Particular suitable wetting agents are the sodium salts of a mixture of secondary heptadecyl sulfates, sold commercially under the name "Teepol" and polyethylene glycol ethers of alkyl phenols sold under the name of "Triton X–100" and "Triton X–155." Preferably concentrate compositions comprising an active compound of the present invention and a suitable setting agent are prepared, and the concentrate is then dispersed in water prior to use.

A further form in which the fungicidal compounds of the present invention may be applied consists of solutions of the active ingredient in suitable inert liquid or semi-solid diluents, in which the active ingredient is present in molecularly dispersed form. The form in which the agents to be employed are applied to the objects treated depends on the nature of the object and the purpose of the application.

Suitable inert solvents for the manufacture of liquid preparations should not be readily inflammable, as odorless as possible and without any toxic effect on humans and animals when properly used. Neither should they have a corrosive effect on the components of the preparations or the material of the storage vessel. Examples of suitable solvents are high boiling oils, e.g., oils of vegetable origin such as castor oil, etc., and lower-boiling solvents such as carbon tetrachloride, ethylene dichloride, acetylene tetrachloride, sorbent naphtha, etc. Mixtures of solvents may also be used. Non-aromatic petroleum oils and xylene are commonly employed.

The active compounds of the present invention may also be applied in the form of dusts utilizing as the inert vehicle such materials as tricalcium phosphate, precipitated chalk, bentonite, kaolin, and kieselguhr, etc.

The compounds may also be employed in the form of aerosols. For this purpose the active ingredient is dissolved, or dispersed in a solvent boiling below room temperature at atmospheric pressure.

The 1,4-dihalo-1,4-dinitro-1,3-butadienes, i.e., 1,4-dichloro-1,4-dinitro-1,3-butadiene and 1,4-dibromo-1,4-dinitro-1,3-butadiene, have shown activity against the foliage disease brown spot on tobacco. In particular they control brown spot (*Alternaria longipes*) which is a very damaging tobacco disease. 1,4-dichloro-1,4-dinitro-1,3-butadiene and 1,4-dibromo-1,4-dinitro-1,3-butadiene have been shown to be effective against brown spot in both greenhouse and field tests.

The following results indicate the effectiveness of the 1,4-dihalo-1,4-dinitro-1,3-butadienes in greenhouse tests in the control of brown spot.

TABLE II.—EFFECTIVE DOSAGE OF COMPOUNDS TESTED IN GREENHOUSE FOR TOBACCO BROWN SPOT ERADICATION (p.p.m.)

| Compound | ED$_3$[1] |
|---|---|
| 1,4-dibromo-1,4-dinitro-1,3-butadiene | 300 |
| 1,4-dichloro-1,4-dinitro-1,3-butadiene | 20 |
| Maneb | 200 |

[1] ED$_3$ = Parts per million active ingredient which elicits a visual rating of "3" = moderately infected.

In the field, 1,4-dichloro-1,4-dinitro-1,3-butadiene has shown control of brown spot at one pound active ingredient per acre. It is equivalent to or better than the proprietary compound Manzate at an identical dosage level.

Although the 1,4-dihalo-1,4-dinitro-1,3-butadienes of this invention show particular promise as foliage fungicides, their use is in no way limited thereto as they are also active against bactericidal pests.

The following results indicate the bactericidal effectiveness of the 1,4-dihalo-1,4-dinitro-1,3-butadienes.

TABLE III

| Compound | Toxicity Rating[1] | | | |
|---|---|---|---|---|
| | Ag. | Xv. | Pa. | Ea. |
| 1,4-dibromo-1,4-dinitro-1,3-butadiene | 3 | 5 | 1 | 5 |
| 1,4-dichloro-1,4-dinitro-1,3-butadiene | 5 | 5 | 5 | 5 |

[1] Ag. = *Agrobacterium tumefaciens*; Xv. = *Xanthomonas vesicatoria*; Pa. = *Pseudomona tabaci*; Ea. = *Erwinia amylovora*.

The bactericidal effectiveness of the 1,4-dihalo-1,4-dinitro-1,3-butadienes shown in Table III was demonstrated in the following manner:

The test organisms *Agrobacterium tumefaciens*, *Xanthomonas vesicatoria*, *Pseudomona tabaci*, and *Erwinia amylovora* were cultured on Difco nutrient agar (pH 7.0) at 20° C. To 50 milliliter Erlenmeyer flasks containing 18 milliliters of sterile melted nutrient agar was added 2 milliliters of a standardly prepared test solution of the 1,4-dihalo-1,4-dinitro-1,3-butadiene. The final concentration of the candidate bactericide was 100 parts per million parts of agar media. Each flask was agitated well to insure a thorough and uniform mixture of the 1,4-dihalo-1,4-dinitro-1,3-butadiene and the culture media, and the mixture was poured immediately into sterile petri dishes. When the agar mixture had solidified, it was inoculated with the test bacteria by gently rubbing the surface of the bacterial colony with a sterile transfer loop and streaking the surface of the agar fortified with the 1,4-dihalo-1,4-dinitro-1,3-butadiene by starting at the center of the petri dish and working toward the edge. This procedure was repeated for each organism. The dish was incubated at 20° C. for 48 hours. The ability of the 1,4-dihalo-1,4-dinitro-1,3-butadiene to inhibit growth was visually rated according to the following designations:

5 = no growth.
3 = moderate growth.
1 = severe, equal to or more growth than agar not fortified with the candidate bactericide.

What is claimed is:
1. A pesticidal composition comprising a minor amount of a 1,4-dihalo-1,4-dinitro-1,3-butadiene of the formula:

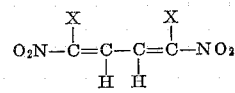

wherein X is a halogen and a major amount of an inert pulverulent solid dust carrier therefor.

2. A fungicidal composition comprising a minor amount of a 1,4-dihalo-1,4-dinitro-1,3-butadiene of the formula:

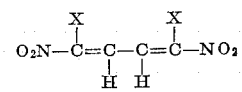

wherein X is a halogen and a major amount of an inert pulverulent solid dust carrier therefor.

3. A fungicidal composition comprising a minor amount of 1,4-dibromo-1,4-dinitro-1,3-butadiene and a major amount of an inert pulverulent solid dust carrier therefor.

4. A fungicidal composition comprising a minor amount of 1,4-dichloro-1,4-dinitro-1,3-butadiene and a major amount of an inert pulverulent solid dust carrier therefor.

5. A fungicidal composition comprising an admixture of 1,4-dichloro-1,4-dinitro-1,3-butadiene and 1,4-dibromo-1,4-dinitro-1,3-butadiene and an inert pulverulent solid dust carrier therefor.

6. A bactericidal composition comprising a minor amount of a 1,4-dihalo-1,4-dinitro-1,3-butadiene and a major amount of an inert pulverulent solid dust carrier therefor.

7. A method for controlling fungi and bacteria which adversely affect plant life which comprises subjecting said fungi and bacteria to an effective amount of a 1,4-dihalo-1,4-dinitro-1,3-butadiene of the formula:

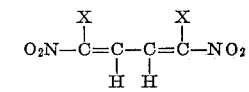

wherein X is a halogen.

8. A method for controlling foliage fungi which adversely affect plant life which comprises subjecting said fungi to a fungicidally effective amount of a 1,4-dihalo-1,4-dinitro-1,3-butadiene of the formula:

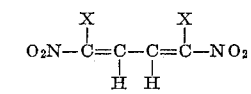

wherein X is a halogen.

9. A method for controlling bacteria which adversely affect plant life which comprises subjecting said bacteria to a bactericidally effective amount of a 1,4-dihalo-1,4-dinitro-1,3-butadiene of the formula:

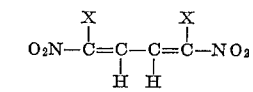

wherein X is a halogen.

10. A method for controlling foliage fungi which adversely affect plant life which comprises subjecting said fungi to a fungicidally effective amount of 1,4-dibromo-1,4-dinitro-1,3-butadiene.

11. A method for controlling foliage fungi which adversely affect plant life which comprises subjecting said fungi to a fungicidally effective amount of 1,4-dichloro-1,4-dinitro-1,3-butadiene.

12. A method for controlling early blight fungi which adversely affect plant life which comprises subjecting said fungi to a fungicidally effective amount of 1,4-dibromo-1,4-dinitro-1,3-butadiene.

13. A method for controlling cucumber anthracnose fungi which adversely affect plant life which comprises subjecting said fungi to a fungicidally effective amount of 1,4-dibromo-1,4-dinitro-1,3-butadiene.

14. A method for controlling apple scab fungi which adversely affect plant life which comprises subjecting said fungi to a fungicidally effective amount of 1,4-dibromo-1,4-dinitro-1,3-butadiene.

15. A method for controlling early blight fungi which adversely affect plant life which comprises subjecting said fungi to a fungicidally effective amount of 1,4-dichloro-1,4-dinitro-1,3-butadiene.

16. A method for controlling cucumber anthracnose fungi which adversely affect plant life which comprises subjecting said fungi to a fungicidally effective amount of 1,4-dichloro-1,4-dinitro-1,3-butadiene.

17. A method for controlling apple scab fungi which adversely affect plant life which comprises subjecting said fungi to a fungicidally effective amount of 1,4-dichloro-1,4-dinitro-1,3-butadiene.

References Cited

Chem. Abstracts 62(10): 11699d, May 10, 1965.
Chem. Abstracts 60(5): 5317b, March 2, 1964.
Chem. Abstracts 48: 1239e (1954).

LEWIS GOTTS, *Primary Examiner.*

S. K. ROSE, *Assistant Examiner.*